(12) United States Patent
Abbott

(10) Patent No.: US 6,542,887 B1
(45) Date of Patent: Apr. 1, 2003

(54) INCORPORATING NATIVE CODE IN JAVA ARCHIVE FILES

(75) Inventor: Paul Harry Abbott, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/512,241

(22) Filed: Feb. 24, 2000

(30) Foreign Application Priority Data

Oct. 29, 1999 (GB) .............................. 9925510

(51) Int. Cl.$^7$ .............................. G06F 17/30; G06F 7/00
(52) U.S. Cl. .............................. 707/2; 707/3; 707/101; 707/102
(58) Field of Search .................... 707/1–10, 100–104.1, 707/103, 2; 709/1, 332, 231, 203; 717/100, 162–167

(56) References Cited

U.S. PATENT DOCUMENTS

| | | | | |
|---|---|---|---|---|
| 5,630,066 A | * | 5/1997 | Gosling ........................ | 709/221 |
| 5,966,702 A | * | 10/1999 | Fresko et al. ................... | 707/1 |
| 5,987,242 A | * | 11/1999 | Bentley et al. ................. | 703/13 |
| 6,052,732 A | * | 4/2000 | Gosling ........................ | 709/229 |
| 6,063,128 A | * | 5/2000 | Bentley et al. ................. | 703/6 |
| 6,110,226 A | * | 8/2000 | Bothner ........................ | 717/153 |
| 6,339,841 B1 | * | 1/2002 | Merrick et al. ............ | 707/103 R |
| 6,349,344 B1 | * | 2/2002 | Sauntry et al. ................. | 709/1 |
| 6,385,643 B1 | * | 5/2002 | Jacobs et al. ................. | 709/201 |
| 6,385,664 B1 | * | 5/2002 | Drees .......................... | 709/331 |

\* cited by examiner

Primary Examiner—Greta Robinson
Assistant Examiner—Linh Black
(74) Attorney, Agent, or Firm—A. Bruce Clay

(57) ABSTRACT

A Java Virtual Machine comprises a class loader and a library file loader. The class loader responds to requests to instantiate a class by searching a classpath in which class files and archived files are stored; and responsive to locating a requested class file in the classpath or within an archived file in the classpath, loads the class into memory. The library file loader responds to requests to load a native code library, by searching a library path in which library files are stored; and responsive to locating a requested library file in the library path, loads the library into memory. According to the invention, the library file loader also searches the classpath; and responsive to locating a requested library file in an archived file in the classpath, loads the library into memory.

6 Claims, 1 Drawing Sheet

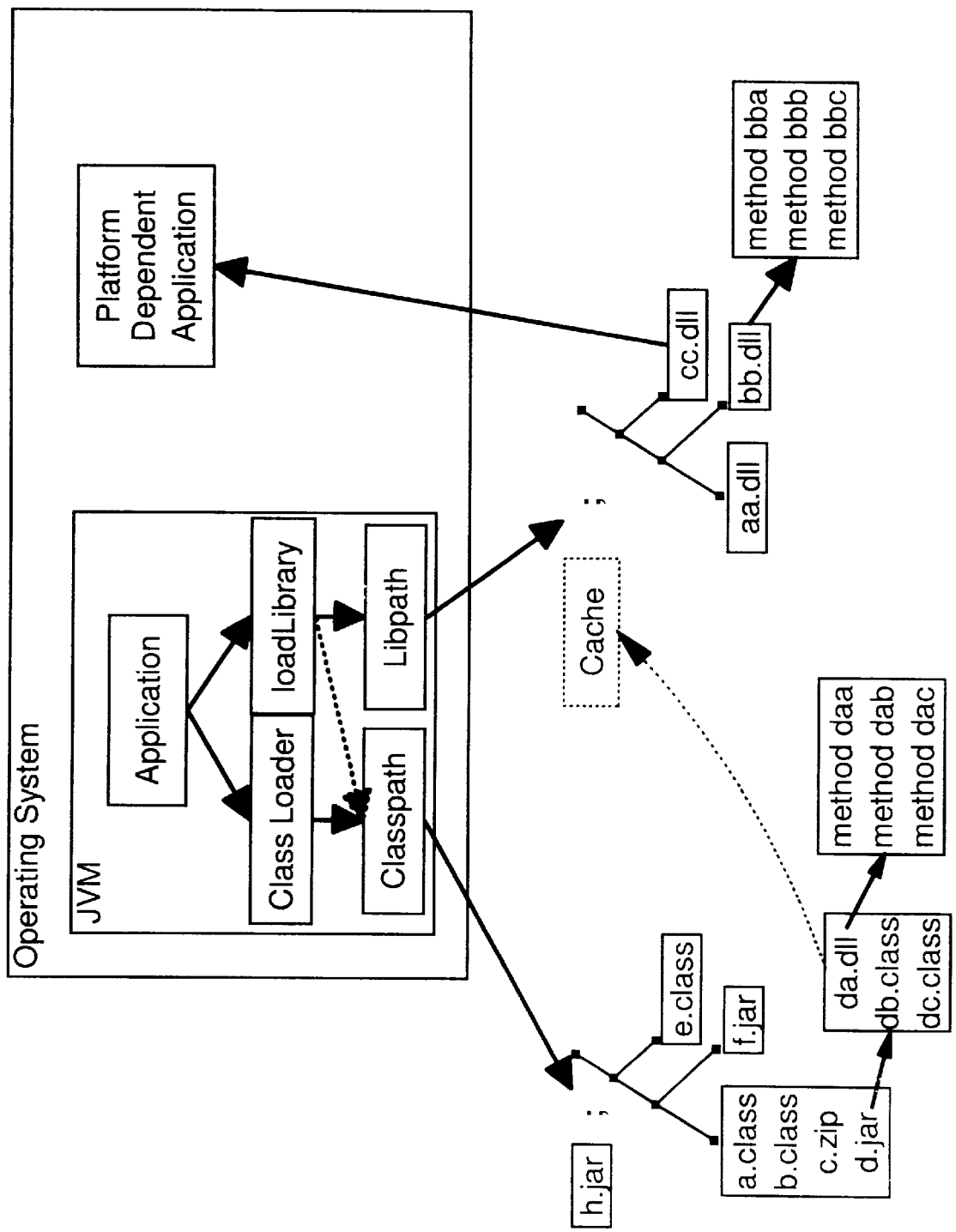

INCORPORATING NATIVE CODE IN JAVA ARCHIVE FILES

FIELD OF THE INVENTION

The present invention relates to a Java Virtual Machine adapted to load native code libraries stored in archived files.

BACKGROUND OF THE INVENTION

JAVA (TM) applications are written as groups of classes, and typically execution of an application begins with the Java Virtual Machine (JVM) using a class loader to instantiate a main class, which in turn creates various objects requiring the instantiation of further classes. Class files are stored in various directory structures indicated by a classpath environmental parameter. In a stand-alone JVM, the class loader looks to classpath, an environmental parameter, which usually includes a sub-directory containing all the dedicated classes for a particular application, to determine where to look for classes. In a browser JVM, classpath also extends to the remote server from which an application (applet) is downloaded.

In an effort to cope with Java applications which have increased in complexity and so in size, it has become common for developers to package classes required for an application into one or more archived files, such as JAR files or ZIP files. Archived files are significantly more compact than their uncompressed component class files and so are particularly useful for deploying an application across a network, such as the Internet.

Archived files are stored in the directories of classpath or they can be individually designated within classpath. In the Figure, the classpath shown includes: a sub-directory structure in which class and archived files a to f are stored; and a direct reference to h.jar. When the JVM needs to instantiate a class, the class loader searches through the classpath directories, including class or archived files, and classpath archived files to find the required class file or to determine if such a class file is stored within an archived file. If a class is stored within an archive, as in the case of classes db and dc, then the JVM uncompresses the class file from the archive directly into memory. Thus, the unarchived classes are not written to disk and, in the case of network applications, far less time is lost uncompressing the file than downloading an uncompressed class from a remote server.

Although, Java provides a means for developing applications in a platform independent manner, some application developers nonetheless either need or find it easier to use native code. In the case of Java applications written for the MICROSOFT WINDOWS™ suite of platforms, such native code typically comprises dynamic link libraries (DLLs) accessed through the Java Native Interface (JNI).

When an application employs native functionality, it should indicate this to the JVM before calling such methods by calling the loadLibrary method on either the java.lang.System or java.lang.Runtime object. Alternatively, the JVM can call the loadLibrary method in response to a native method call to a library which has not been loaded. In any case, loadLibrary operates in the same manner. The loadLibrary method is passed a string comprising the name of the native code library to be loaded. Although implementation specific, generally the method then searches through a library path (analogous to classpath) for the appropriate library. In the Figure, the library path includes a sub-directory structure including DLLs aa to cc and a cache sub-directory whose purpose will be explained later. On finding a library, it is loaded into memory and its methods, for example, methods bba . . . bbc from library bb.dll, become exposed for use within the Java application.

While this functionality in itself is quite useful, it does means that library files must be available to the JVM, in the same manner as to platform dependent applications, before applications availing of such libraries are executed. This does not pose a problem where default native code libraries are accessed, but more and more developers are implementing applications partially in Java and partially in native format. This means that for network applications, in particular, the native libraries must be installed before the network application can execute, and this places a high deployment cost on such applications.

There has been a clamour from developers seeking to place native code in archived files, for example, d.jar, which could then be deployed with the classes comprising the remainder of the Java application. This would mean that Java applications could be deployed and updated in a single step as they are required by users, thus making the functionality of native code more accessible to both developers and users.

Notwithstanding, this functionality has not been made available to date in a Java Virtual Machine.

SUMMARY OF THE INVENTION

The present invention, however, provides a Java Virtual Machine according to a Java virtual Machine comprising: means, responsive to a request to instantiate a class, for searching a first path in which class files and archived files are stored; means, responsive to locating a requested class file in said first path or within an archived file in said first path, for loading said class into memory; means, responsive to a request to load a native code library, for searching a second path in which library files are stored; means, responsive to locating a requested library file in said second path, for loading said library into memory; wherein said means for searching a second path is adapted to search said first path; and in that said means for loading a library is responsive to locating a requested library file in an archived file in said first path to load said library into memory.

It will be seen that in spite of adapting the JVM to include the platform dependent functionality of the invention, whereby archived files may include native code, the JVM is no more platform dependent than conventional JVM's, which allow applications to make native method calls.

BRIEF DESCRIPTION OF THE DRAWINGS

Embodiments of the invention will now be described with reference to the accompanying drawing which is a schematic diagram illustrating a classpath and a library path used by a Java Virtual Machine.

DESCRIPTION OF THE PREFERRED EMBODIMENTS

Referring now to FIG. 1, a stand-alone JVM is set up on a machine running on any platform. A library path (LIBPATH) is defined which points to one or more directories on the hard drive where required native code libraries can be found—in this case DLLs aa to cc. A class path (CLASSPATH) is defined to point to a list of locations where class files can be found—in this case a sub-directory structure comprising files a to f and an explicit designation of archived file h.jar. Nonetheless, it should be seen that the invention is not limited to a stand-alone JVM and could equally apply to a browser JVM. The invention is also applicable to native code libraries for any platform, not necessarily those of Microsoft.

A conventional JVM normally has two sets of routines, one for loading native code libraries from the library path and a second for loading class files from classpath. The second mechanism is also used to load property files and other data files used by Java code.

According to the invention, the conventional native code library load mechanism, ie loadLibrary, is augmented to search the classpath for the required library (this could be before, after or during the conventional search of the library path).

Where the JVM operates on a Microsoft platform, the search identifies the correct DLL by its name, in this case, da.dll. Preferably, the name includes a platform specific component (possibly a suffix for example ".NT", ".AIX", ".OS2", ".OS390"). Thus, the JVM, which knows which platform it is running on, can decide if a DLL whose name, excluding the suffix, matches that passed by the application to the loadLibrary method is suitable for the JVM's platform. This means that an application can make call "System.loadLibrary(X.dll)", but that more than one version of X.dll, eg X.dll.NT and X.dll.OS2, is included in an archived file. A Microsoft JVM will ignore X.dll.OS2 if it is detected first in a search and can decide which DLL it is willing to load based on the DLLs suffix platform designation.

This also means that the file names need to be correctly set when the application (of which the library forms a part) is packaged. This can be done manually or the integrated development environment (IDE), for example, IBM's Visual Age for Java, within which such applications are typically developed, needs to be adapted to package native code with the correct file names.

In a first embodiment, the library path includes a cache sub-directory If the required native code library is found and it is inside an archived file, for example, the search detects that da.dll is stored within d.jar, the library is extracted from the archived file and copied to the cache sub-directory.

It should be seen that if the archived file containing native code had been explicitly decompressed by a user, then the search would directly detect the DLL in the classpath sub-directory into which the archived file was decompressed. If such a DLL is found, it is copied directly to the cache sub-directory.

Once the DLL had been placed in the cache directory, loadLibrary can continue in the conventional manner, using its normal resolution and loading mechanism to load the library from the cache directory.

Preferably, the cache directory is only used by the JVM for libraries extracted from archived files. The JVM can further detect once the operating system has released such libraries and so can delete such libraries from the cache so as to prevent possible conflicts when other applications execute.

The advantage of the first embodiment is that the changes to the JVM are minimal. The operating system provided functions for loading and resolving DLL functions can still be used and the embodiment easily extended to any platform which supports DLLs or that operates equivalently.

The disadvantages of the first embodiment are that the existence of the libraries is externalised and that moving the library from the archived file to the hard drive, then loading it from the hard drive into memory is not the most efficient approach.

In a second embodiment, the native code library loading mechanism is again augmented to search classpath for the required library. However, once the library is found, either directly or within an archived file, the JVM loads the library directly into memory, without writing the library to disk, in a manner similar to the way in which class files are loaded directly into memory.

It will be seen, however, that even conventional direct loading of native code libraries into memory is platform dependent and as such the JVM for each platform needs to take into account such differences when extracting the library from an archive directly into memory.

Although more complex to implement, the advantages of the second embodiment are that it is quicker than the first embodiment and hidden from the user.

It should be noted that classpath and the library path need not be mutually exclusive. The invention is directed towards searching the archived files normally used by a Java application to store compressed classes to determine if such archived files include required native code libraries.

What is claimed is:

1. A Java Virtual Machine comprising:
   means, responsive to a request to instantiate a class, for searching a first path in which class files and archive files are stored;
   means, responsive to locating a requested class file in said first path or within an archive file in said first path, for loading said class into memory;
   means, responsive to a request to load a native code library, for searching a second path in which library files are stored;
   means, responsive to locating a requested library file in said second path, for loading said library into memory;
   wherein said means for searching a second path is adapted to search said first path; and in that said means for loading a library is responsive to locating a requested library file in an archive file in said first path to load said library into memory, and
   wherein said means for loading a library is responsive to locating a requested library file in said first path to copy said file into a directory in said second path from which said library is loaded into memory.

2. A Java Virtual Machine as claimed in claim 5 wherein said Virtual Machine is responsive to an operating system releasing a library file found in said first path for deleting said library file from said directory in said second path.

3. A Java Virtual Machine comprising:
   means, responsive to a request to instantiate a class, for searching a first path in which class files and archive files are stored;
   means, responsive to locating a requested class file in said first path or within an archive file in said first path, for loading said class into memory;
   means, responsive to a request to load a native code library, for searching a second path in which library files are stored;
   means, responsive to locating a requested library file in said second path, for loading said library into memory;
   wherein said means for searching a second path is adapted to search said first path; and in that said means for loading a library is responsive to locating a requested library file in an archive file in said first path to load said library into memory, and wherein said library file is a dynamic link library.

4. In a Java Virtual Machine comprising means, responsive to a request to instantiate a class, for searching a first path in which class files and archive files are stored; and means, responsive to locating a requested class file in said first path or within an archive file in said first path, for loading said class into memory, a method for loading a native code library comprising the steps of:

responsive to a request to load a native code library, searching said first path and a second path in which library files are stored;

responsive to locating a requested library file in said second path, loading said library into memory; and responsive to locating a requested library file in an archive file in said first path, loading said library into memory.

5. Computer program product comprising computer program code stored on a computer readable storage medium for, when executed on a computing device, loading native code libraries, the program code comprising:

program product means, responsive to a request to instantiate a class, for searching a first path in which class files and archived files are stored;

program product means, responsive to locating a requested class file in said first path or within an archived file in said first path, for loading said class into memory;

program product means, responsive to a request to load a native code library, for searching a second path in which library files are stored;

program product means, responsive to locating a requested library file in said second path, for loading said library into memory;

wherein said program product means for searching a second path is adapted to search said first path; and in that said program product means for loading a library is responsive to locating a requested library file in an archived file in said first path to load said library into memory.

6. A Java Virtual Machine comprising:

means, responsive to a request to instantiate a class, for searching a first path in which class files and archived files are stored;

means, responsive to locating a requested class file in said first path or within an archived file in said first path, for loading said class into memory;

means, responsive to a request to load a native code library, for searching a second path in which library files are stored;

means, responsive to locating a requested library file in said second path, for loading said library into memory;

wherein said means for searching a second path is adapted to search said first path; and in that said means for loading a library is responsive to locating a requested library file in an archived file in said first path to load said library into memory; wherein said means for loading a library is responsive to locating a requested library file in an archived file in said first path to extract said library file from said archived into a directory in said second path from which said library is loaded into memory; and responsive to an operating system releasing a library file found in said first path for deleting said library file from said directory in said second path.

* * * * *